(12) United States Patent
Zhang et al.

(10) Patent No.: US 12,618,451 B2
(45) Date of Patent: May 5, 2026

(54) RAPID ACTIVE VIBRATION REDUCTION METHOD FOR HIGH-SPEED MOTION STAGE

(71) Applicant: GUANGDONG UNIVERSITY OF TECHNOLOGY, Guangzhou (CN)

(72) Inventors: Lanyu Zhang, Guangzhou (CN); Jian Gao, Guangzhou (CN); Shaoxuan Zhang, Guangzhou (CN); Yun Chen, Guangzhou (CN); Xin Chen, Guangzhou (CN); Kai Zhang, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 680 days.

(21) Appl. No.: 18/154,533

(22) Filed: Jan. 13, 2023

(65) Prior Publication Data

US 2023/0235810 A1 Jul. 27, 2023

(30) Foreign Application Priority Data

Jan. 21, 2022 (CN) .......................... 202210074157.3

(51) Int. Cl.
*F16F 15/00* (2006.01)
*F16F 15/02* (2006.01)

(52) U.S. Cl.
CPC ............ *F16F 15/002* (2013.01); *F16F 15/02* (2013.01); *F16F 2222/04* (2013.01); *F16F 2228/066* (2013.01); *F16F 2230/18* (2013.01)

(58) Field of Classification Search
CPC .................................................. F16F 2222/04
See application file for complete search history.

(56) References Cited

U.S. PATENT DOCUMENTS

2019/0032747 A1* 1/2019 Kishimoto ............ F16F 15/002

FOREIGN PATENT DOCUMENTS

| | | | |
|---|---|---|---|
| CN | 103822837 A | 5/2014 | |
| CN | 106379298 A | 2/2017 | |
| CN | 109579768 A * | 4/2019 | |
| CN | 209585004 U * | 11/2019 | |
| CN | 113494559 A * | 10/2021 | ............ F16F 15/022 |
| EP | 2261530 A1 * | 12/2010 | ............. F16F 15/02 |
| JP | 2012013126 A | 1/2012 | |
| KR | 20130018610 A * | 2/2013 | ............ F16F 15/002 |

(Continued)

*Primary Examiner* — Melody M Burch

(57) ABSTRACT

A rapid active vibration reduction method for a high-speed motion stage includes acquiring motion parameters of a motion body of the motion stage in current motion; determining a vibration reduction mode of a vibration reduction device according to the motion parameters; and controlling an action end of the vibration reduction device to contact with the motion body of the motion stage or contact with a driving device for driving the motion body to move based on the vibration reduction mode, so that a contact friction force used for suppressing vibration of the motion body is generated. Realizing vibration reduction by means of active friction can reduce vibration of the motion body in a specific stage needing vibration reduction, and the action end of the vibration reduction device does not need to contact with the motion body or does not need to contact with the driving device before vibration reduction.

10 Claims, 4 Drawing Sheets

(56)        References Cited

FOREIGN PATENT DOCUMENTS

| KR | 101389994 | B1 | | 4/2014 | | |
|---|---|---|---|---|---|---|
| KR | 20160122488 | A | * | 10/2016 | .............. | F16F 15/02 |
| WO | WO-2014108155 | A1 | * | 7/2014 | .............. | F16F 15/02 |

* cited by examiner

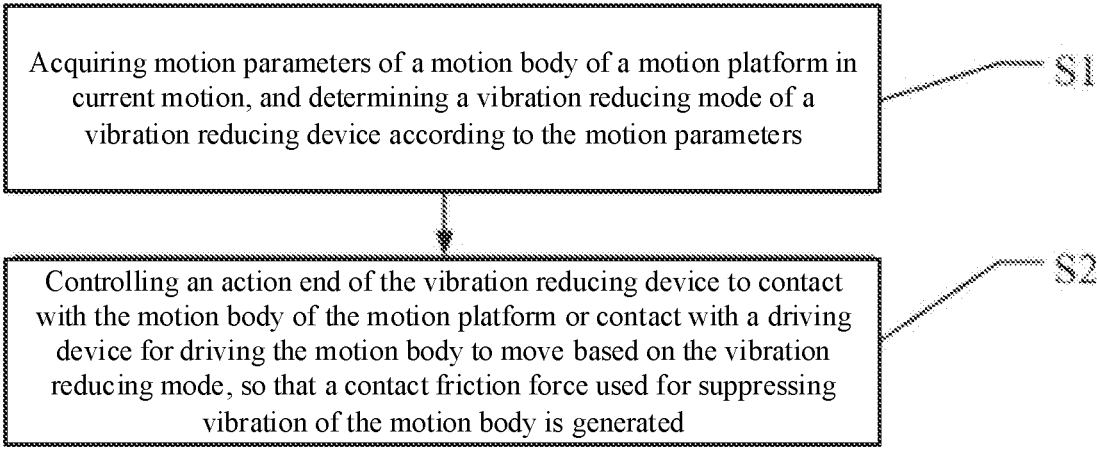

Acquiring motion parameters of a motion body of a motion platform in current motion, and determining a vibration reducing mode of a vibration reducing device according to the motion parameters — S1

Controlling an action end of the vibration reducing device to contact with the motion body of the motion platform or contact with a driving device for driving the motion body to move based on the vibration reducing mode, so that a contact friction force used for suppressing vibration of the motion body is generated — S2

FIG. 6

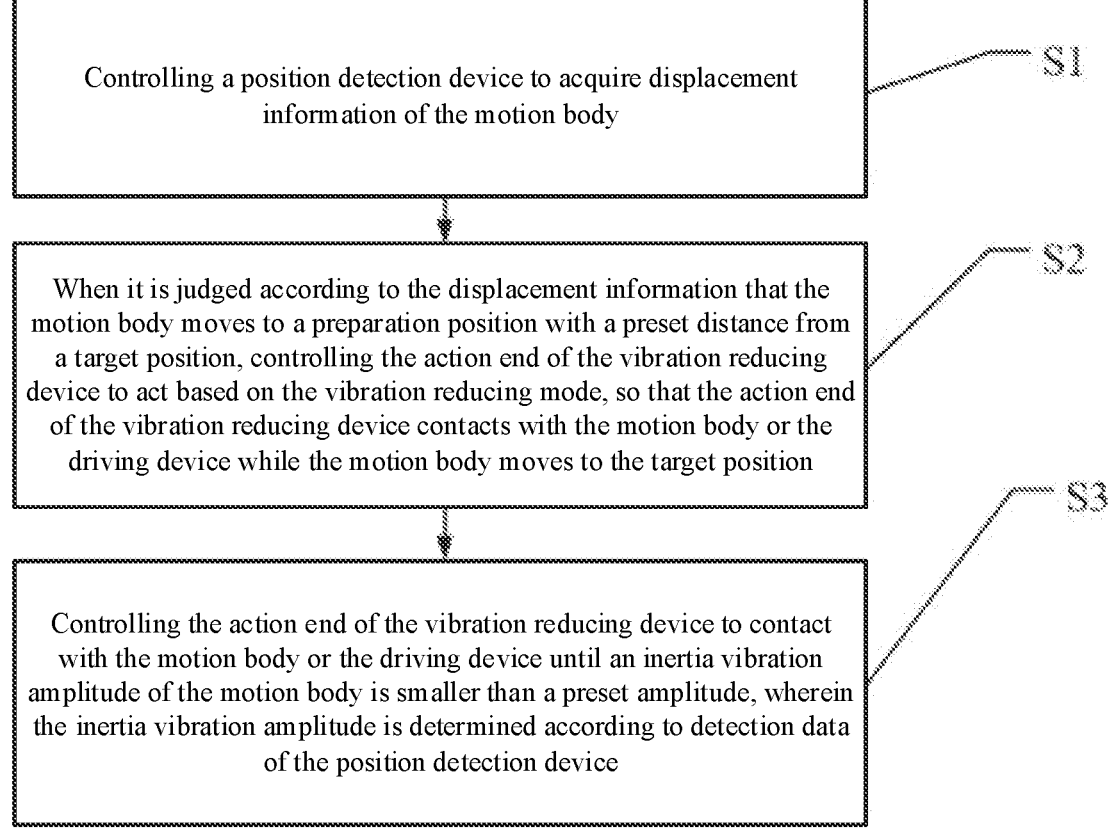

Controlling a position detection device to acquire displacement information of the motion body — S1

When it is judged according to the displacement information that the motion body moves to a preparation position with a preset distance from a target position, controlling the action end of the vibration reducing device to act based on the vibration reducing mode, so that the action end of the vibration reducing device contacts with the motion body or the driving device while the motion body moves to the target position — S2

Controlling the action end of the vibration reducing device to contact with the motion body or the driving device until an inertia vibration amplitude of the motion body is smaller than a preset amplitude, wherein the inertia vibration amplitude is determined according to detection data of the position detection device — S3

FIG. 7

RAPID ACTIVE VIBRATION REDUCTION METHOD FOR HIGH-SPEED MOTION STAGE

CROSS REFERENCE TO RELATED APPLICATIONS

This application claims foreign priority of Chinese Patent Application No. 202210074157.3, filed on Jan. 21, 2022 in the China National Intellectual Property Administration, the disclosures of all of which are hereby incorporated by reference.

TECHNICAL FIELD

The present application relates to the technical field of mechanical devices, and particularly to a rapid active vibration reduction method for a high-speed motion stage.

BACKGROUND OF THE DISCLOSURE

High-speed motion stage device is one of core devices in microelectronic manufacturing. Since a motion stage in the high-speed motion stage device is usually accompanied by inertial vibration during positioning, how to rapidly suppress inertial vibration is a key issue to improve the operation efficiency and the development of microelectronic manufacturing.

At present, in the face of the vibration problem of the high-speed motion stage device, vibration reduction is often realized by using a control method or adding a vibration reduction structure. The control method still has the problems of complex parameter adjustment and poor adaptability for the vibration reduction of the stage under a condition of high-speed motion. However, a mode of adding the vibration reduction structure is usually a passive vibration reduction mode, with an unsatisfactory effect on vibration suppression of the high-speed stage device.

SUMMARY OF THE DISCLOSURE

In view of this, the present application aims to provide a rapid active vibration reduction method for a high-speed motion stage, which has a flexible and good vibration suppression effect.

In order to achieve the above objective, the present application provides a rapid active vibration reduction method for a high-speed motion stage, which comprises the following steps of:

S1: acquiring motion parameters of a motion body of the motion stage in current motion, and determining a vibration reduction mode of a vibration reduction device according to the motion parameters; and S2: controlling an action end of the vibration reduction device to contact with the motion body of the motion stage or contact with a driving device for driving the motion body to move based on the vibration reduction mode, so that a contact friction force used for suppressing vibration of the motion body is generated;

wherein the vibration reduction device is arranged outside the motion body, the action end of the vibration reduction device is telescopically controlled, and the action end does not contact with the motion body or does not contact with the driving device when the motion body is in a motion state.

Furthermore, the S2 specifically comprises:

controlling the action end of the vibration reduction device to contact with the motion body based on the vibration reduction mode, so that the contact friction force used for suppressing vibration of the motion body is generated;

wherein an action direction of the action end of the vibration reduction device is orthogonal to a motion direction of the motion body.

Furthermore, the S2 specifically comprises:

S21: controlling a position detection device to acquire displacement information of the motion body;

S22: when it is judged according to the displacement information that the motion body moves to a preparation position with a preset distance from a target position, controlling the action end of the vibration reduction device to act based on the vibration reduction mode, so that the action end of the vibration reduction device contacts with the motion body or the driving device while the motion body moves to the target position; and S23: controlling the action end of the vibration reduction device to contact with the motion body or the driving device until an inertial vibration amplitude of the motion body is smaller than a preset amplitude, wherein the inertial vibration amplitude is determined according to detection data of the position detection device.

Furthermore, the position detection device is an absolute grating ruler.

Furthermore, the vibration reduction device comprises a telescopic driving device; and one end of a telescopic portion of the driving device is capable of contacting with the motion body or contacting with the driving device.

Furthermore, the vibration reduction device further comprises a buffer structure; and the buffer structure is mounted at a telescopic end of the telescopic driving device, and is used for contacting with the motion body or the driving device.

Furthermore, the telescopic driving device is a linear motor device, a piezoelectric ceramic element, a magnetostriction element, an electric push rod device, a hydraulic push rod device or other linear telescopic devices.

Furthermore, the buffer structure is an aluminum alloy cushion block, a brass block, oil film paper or other contact buffer structures.

Furthermore, the driving device comprises a driving motor and a screw rod;

the screw rod is pivotally fixed on a stage body of the motion stage, and the screw rod movably penetrates through the motion body, and is in threaded fit with the motion body; and the driving motor is mounted on the stage body, and an output shaft is connected with one end of the screw rod.

Furthermore, the S2 specifically comprises:

controlling the action end of the vibration reduction device to contact with the output shaft of the driving motor or contact with the screw rod based on the vibration reduction mode, so that the contact friction force used for suppressing vibration of the motion body is generated;

wherein an action direction of the action end of the vibration reduction device is orthogonal to an axial direction of the output shaft of the driving motor, or is orthogonal to an axial direction of the screw rod.

It can be seen from the above technical solution that, according to the rapid active vibration reduction method for the high-speed motion stage provided by the present application, the vibration reduction device is designed to satisfy that, when the vibration of the motion body needs to be suppressed, the action end of the vibration reduction device moves to contact with the motion body or contact with the driving device, so that the vibration of the motion body is suppressed by the generated contact friction force. Realizing vibration reduction by means of active friction can reduce vibration of the motion body in a specific stage needing vibration reduction, and the action end of the vibration reduction device does not need to contact with the motion body or does not need to contact with the driving device before vibration reduction, so that interference cannot be formed on a motion of the motion body. Moreover, the motion parameters of the motion body are associated with the adjustment of the contact friction force, the vibration reduction mode is determined by the motion parameters of the motion body, and then the contact friction force generated by making the action end of the vibration reduction device contact with the motion body or the driving device is adjusted based on the vibration reduction mode, so that inertial vibration of the motion body is reversely suppressed by an appropriate contact friction force, which means that the inertial vibration of the motion body can be rapidly suppressed by adjusting the contact friction force.

The rapid active vibration reduction method for the high-speed motion stage designed above has the following beneficial effects.

1. An established stage system is simple in structure, a friction force opposite to the motion direction of the motion body is generated by making the action end of the vibration reduction device contact with the motion body or contact with the driving device, active friction is used to realize vibration suppression, and this vibration suppression mode may always have a reverse suppression action on the inertial vibration without increasing the inertial vibration, so that a problem of inertial vibration of the motion body with a large stroke, a high speed and a high accelerated speed can be effectively solved, and significant suppression action and effect are achieved.

2. When the vibration is not suppressed, the action end of the vibration reduction device does not need to contact with the motion body or the driving device, and may not interfere with the motion of the motion body, thus ensuring an accuracy of the motion of the motion body.

3. The vibration reduction device is controlled to contact with the motion body or the driving device to generate the friction force based on the motion parameters of the motion body, which can effectively suppress various inertial vibrations generated under different motion conditions, and an adaptive dynamic vibration reduction action may be flexibly generated as long as the appropriate friction force is used, so that a dynamic flexible vibration reduction action is achieved.

BRIEF DESCRIPTION OF THE DRAWINGS

In order to illustrate the technical solution in the embodiments of the present application or the prior art more clearly, the drawings which need to be used in describing the embodiments or the prior art will be briefly introduced hereinafter. Apparently, the drawings described hereinafter are only some embodiments of the present application, those of ordinary skills in the art may obtain other drawings according to these drawings without going through any creative work.

FIG. 6 is a flow chart of First Embodiment of a rapid active vibration reduction method for a high-speed motion stage provided in the present application; and FIG. 7 is a flow chart of Second Embodiment of the rapid active vibration reduction method for the high-speed motion stage provided in the present application.

Figure 1:
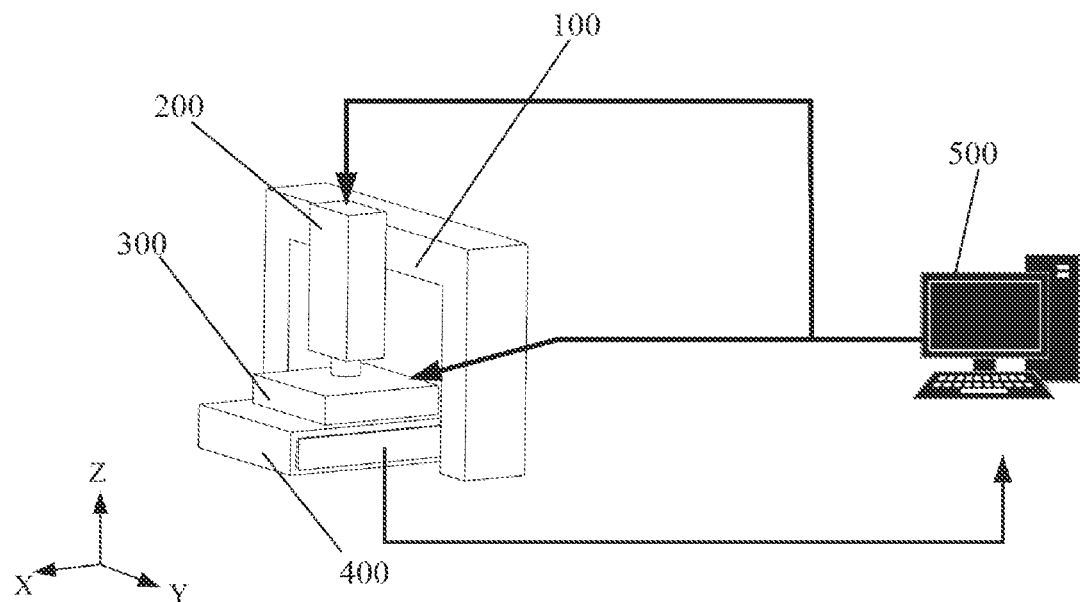
FIG. 1 is a schematic diagram of an overall structure of a motion stage system established by a rapid active vibration reduction method for a high-speed motion stage provided in the present application.
Figure 2:
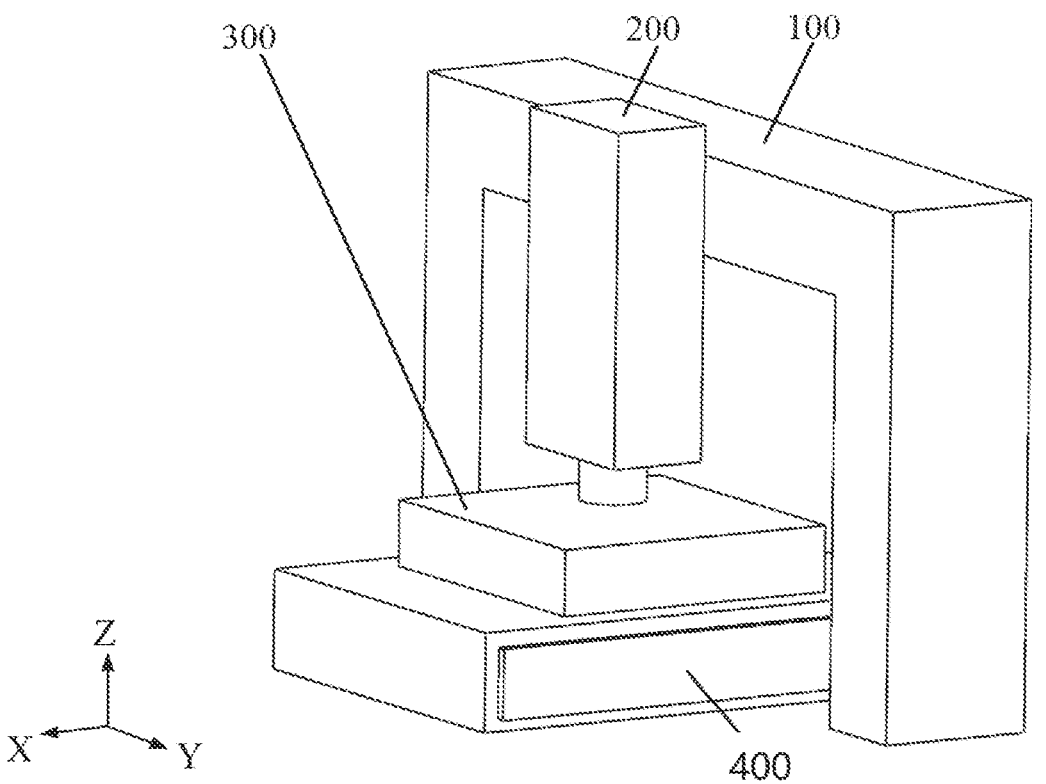
FIG. 2 is a schematic structural diagram of the motion stage system provided in the present application which is not provided with a control device.

In the drawings: 100 refers to fixing frame; 200 refers to vibration reduction device; 300 refers to motion stage; 301 refers to motion body; 302 refers to screw rod; 400 refers to position detection device; and 500 refers to control device.

DETAILED DESCRIPTION OF THE DISCLOSURE

The technical solution of the embodiments of the present application is clearly and completely described hereinafter with reference to the drawings. Apparently, the described embodiments are only some but not all of the embodiments of the present application. Based on embodiments in the embodiments of the present application, all other embodiments obtained by those of ordinary skills in the art without going through any creative work should all fall within the scope of protection of the embodiments of the present application.

In the description of the embodiments of the present application, it should be noted that the orientation or position relationship indicated by the terms "center", "up", "down", "left", "right", "vertical", "horizontal", "inside". "outside", and the like is based on the orientation or position relationship shown in the drawings, it is only for the convenience of description of the embodiments of the present application and simplification of the description, and it is not to indicate or imply that the indicated device or element must have a specific orientation, and be constructed and operated in a specific orientation. Therefore, the terms should not be understood as limiting the embodiments of the present application. Moreover, the terms "first", "second" and "third" are used for descriptive purposes only and cannot be understood as indicating or implying relative importance.

In the description of the embodiments of the disclosure, it should be noted that the terms "mounting", "connected" and "connection" should be understood in a broad sense unless otherwise clearly specified and defined. For example, they may be fixed connection, replaceable connection or integrated connection; may be mechanical connection or electrical connection; and may be direct connection, or indirect connection through an intermediate medium, and connection inside two elements. The specific meanings of the above terms in the embodiments of the present application may be understood in a specific case by those of ordinary skills in the art.

The embodiments of the present application disclose a rapid active vibration reduction method for a high-speed motion stage.

Figure 3:
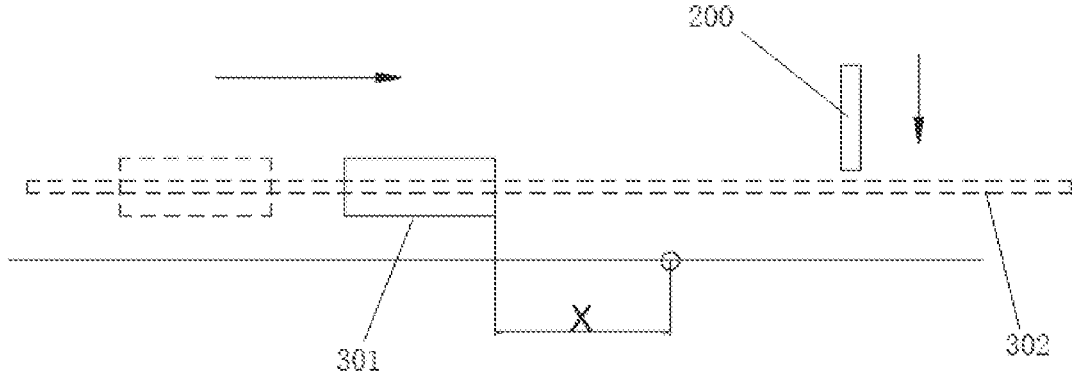
FIG. 3 is a schematic diagram of a motion body of the motion stage system provided in the present application which is matched with a vibration reduction device when moving to a preparation position.

With reference to FIG. 6, FIG. 1 and FIG. 3, First Embodiment of the rapid active vibration reduction method for the high-speed motion stage provided in the embodiments of the present application comprises the following steps.

In S1, motion parameters of a motion body of the motion stage in current motion are acquired, and a vibration reduction mode of a vibration reduction device is determined according to the motion parameters.

In S2, an action end of the vibration reduction device is controlled to contact with the motion body of the motion stage or contact with a driving device for driving the motion body to move based on the vibration reduction mode, so that a contact friction force used for suppressing vibration of the motion body is generated.

The vibration reduction device is arranged outside the motion body, the action end of the vibration reduction device is telescopically controlled, and the action end does not contact with the motion body or does not contact with the driving device when the motion body is in a motion state.

A body for implementing the active vibration reduction method in the present application is a control device 500, and the control device 500 may be a PLC control device, a computer, and the like, which is not limited.

Structural composition of the motion stage 300 may comprise a stage body, a motion body 301 and a driving device. The driving device is mounted on the stage body, is connected with the motion body 301, and is used for driving the motion body 301 to move.

The control device 500 may be in communication connection with the motion stage 300, and is used for controlling the driving device to drive the motion body 301 to move according to a motion instruction. The motion instruction may be generated by operating an operation interface of the control device 500 via an operator or generated by a background terminal, and then is sent to the control device 500, which is not limited.

For the step S1: specifically, the control device 500 is in communication connection with the vibration reduction device 200, and is used for acquiring the motion parameters of the motion body 301, and the vibration reduction mode of the vibration reduction device 200 is determined according to the motion parameters. The motion parameters refer to relevant motion parameters of the motion body 301 in current motion. Since each motion of the motion body 301 may have corresponding motion parameters based on different motion instructions, the vibration reduction mode of the vibration reduction device 200 is determined/set based on relevant motion parameters of the motion body 301 in each motion. The motion parameters comprise a set speed, a set accelerated speed and a set displacement. The motion parameters may be acquired and determined by parsing the motion instruction. After the motion parameters are determined, the control device 500 may control the motion body 301 to move through the driving device based on the set speed, the set accelerated speed and the set displacement, so that the motion body 301 moves to a specified target position according to the set speed, the set accelerated speed and the set displacement, thus finishing the current motion. When the motion parameters are determined by the control device 500, a current motion state of the motion body 301 is determined, and then the vibration reduction mode can be determined based on a corresponding relationship between the motion state and the vibration reduction mode, wherein the relationship between the motion state and the vibration reduction mode may be summarized based on historical test data, which is not limited specifically.

A magnitude of output displacement, a magnitude of force and a moment of vibration reduction output—a moment of vibration generation of the action end of the vibration reduction device 200 are determined by determining the vibration reduction mode, thus ensuring that the vibration reduction device 200 can have a more appropriate vibration reduction effect on current motion body 301 under corresponding motion parameters, so that the vibration reduction device 200 can better adapt to vibration reduction of current motion body 301.

For the step S2: when vibration needs to be suppressed, the control device 500 controls the action end of the vibration reduction device 200 to contact with the motion body 301 or contact with the driving device based on the vibration reduction mode, so that the contact friction force used for suppressing vibration of the motion body 301 is generated. In the designed solution of the present application, the vibration reduction device 200 may directly suppress inertial vibration of the motion body 301 by contacting with the motion body 301, or indirectly suppress the inertial vibration of the motion body 301 by contacting with the driving device.

According to the rapid active vibration reduction method for the high-speed motion stage provided by the present application, it can be seen from the above technical solution that the vibration reduction device 200 is designed to satisfy the action end of the vibration reduction device moving to contact with the motion body 301 or contact with the driving device when the vibration of the motion body 301 needs to be suppressed, so that the vibration of the motion body 301 is suppressed by the generated contact friction force. Realizing vibration reduction by means of active friction can reduce vibration of the motion body 301 in a specific stage needing vibration reduction, and the action end of the vibration reduction device 200 does not need to contact with the motion body 301 or does not need to contact with the driving device before vibration reduction, so that interference cannot be formed on a motion of the motion body 301. Moreover, the motion parameters of the motion body 301 are associated with the adjustment of the contact friction force, the vibration reduction mode is determined by the motion parameters of the motion body 301, and then the contact friction force generated by making the action end of the vibration reduction device 200 contact with the motion body 301 or the driving device is adjusted based on the vibration reduction mode, so that inertial vibration of the motion body 301 is reversely suppressed by an appropriate contact friction force, which means that the inertial vibration of the motion body 301 can be rapidly suppressed by adjusting the contact friction force.

The rapid active vibration reduction method for the high-speed motion stage designed above has the following beneficial effects.

1. An established stage system is simple in structure, a friction force opposite to the motion direction of the motion body 301 is generated by making the action end of the vibration reduction device 200 contact with the motion body 301 or contact with the driving device, active friction is used to realize vibration suppression, and this vibration suppression mode may always have a reverse suppression action on the inertial vibration without increasing the inertial vibration, so that a problem of inertial vibration of the motion body 301 with a large stroke, a high speed and a high accelerated speed can be effectively solved, significant suppression action and effect are achieved, a vibration attenuation time of the motion stage 300 is reduced, and a working efficiency is improved.

2. When the vibration is not suppressed, the action end of the vibration reduction device 200 does not need to contact with the motion body 301 or the driving device, and may not interfere with the motion of the motion body 301, thus ensuring an accuracy of the motion of the motion body 301.

3. The vibration reduction device 200 is controlled to contact with the motion body 301 or the driving device to generate the friction force based on the motion parameters of the motion body 301, which can effectively suppress various inertial vibrations generated under different motion conditions, and an adaptive dynamic vibration reduction action may be flexibly generated as long as the appropriate friction force is used, so that a dynamic flexible vibration reduction action is achieved.

The above is the First Embodiment of the rapid active vibration reduction method for the high-speed motion stage provided by the embodiments of the present application, and the following is Second Embodiment of the rapid active vibration reduction method for the high-speed motion stage provided by the embodiments of the present application. Details refer to FIG. 1 to FIG. 5 and FIG. 7.

Based on the solution in First Embodiment above:

Furthermore, the step S2 specifically comprises the following step.

The action end of the vibration reduction device is controlled to contact with the motion body based on the vibration reduction mode, so that the contact friction force used for suppressing vibration of the motion body is generated. An action direction of the action end of the vibration reduction device is orthogonal to a motion direction of the motion body.

Taking the action end of the vibration reduction device 200 contacting with the motion body 301 to realize vibration suppression as an example, in order to make a vibration suppression effect better, the action direction of the action end of the vibration reduction device 200 is designed to be orthogonal to the motion direction of the motion body 301, which means that the action direction of the action end of the vibration reduction device 200 is distributed to be orthogonal to the motion direction of the motion body 301 by 90°. When the action end of the vibration reduction device 200 moves tangentially in the motion direction of the motion body 301 to contact with an output end of the stage, a friction force opposite to the motion direction of the motion body 301 may be generated. The vibration reduction mode may always generate a reverse vibration reduction action on the inertial vibration, without increasing the inertial vibration, and the vibration reduction action exerted by the vibration reduction device 200 is more sustained and stable. The vibration reduction device 200 may be mounted and distributed in a direction orthogonal to the motion direction of the motion body 301. Specifically, the vibration reduction device 200 may be fixed by a fixing frame 100, a structure of the frame may be a gantry-like frame fixed on the motion stage 300, which is not limited specifically. Moreover, the vibration reduction device 200 is inversely mounted on the fixing frame 100 along a Z-axis direction, and the action direction of the action end of the vibration reduction device may intersect with an X-axis motion direction of the motion body 301. By adding a force in the Z-axis direction to contact with the motion body 301 moving in the X-axis direction, a magnitude of friction resistance of the motion body 301 in the X-axis direction is changed, and by adjusting the vibration reduction device 200 to output an appropriate force, a rapid suppression action can be achieved, so that rapid suppression of inertial vibration of the high-speed motion stage 300 is finally realized.

Furthermore, the step S2 specifically comprises the following steps.

In S21, a position detection device is controlled to acquire displacement information of the motion body. That is, the position detection device 400 detects a position of the motion body 301 in real time and feeds back the position to the control device 500.

In S22, when it is judged according to the displacement information that the motion body moves to a preparation position with a preset distance from a target position, the action end of the vibration reduction device is controlled to act based on the vibration reduction mode, so that the action end of the vibration reduction device contacts with the motion body or the driving device while the motion body moves to the target position.

In S23, the action end of the vibration reduction device is controlled to contact with the motion body or the driving device until an inertial vibration amplitude of the motion body is smaller than a preset amplitude. The inertial vibration amplitude is determined according to detection data of the position detection device.

When the vibration reduction device 200 designed in the present application is used to reduce vibration, the action end of the vibration reduction device needs to move from a position not contacting with the motion stage 300 to a position contacting with the motion stage 300, and acts on the motion stage 300, thus suppressing the inertial vibration of the motion body 301. Therefore, an acting occasion of vibration reduction of the vibration reduction device 200 is also very important.

Figure 4:
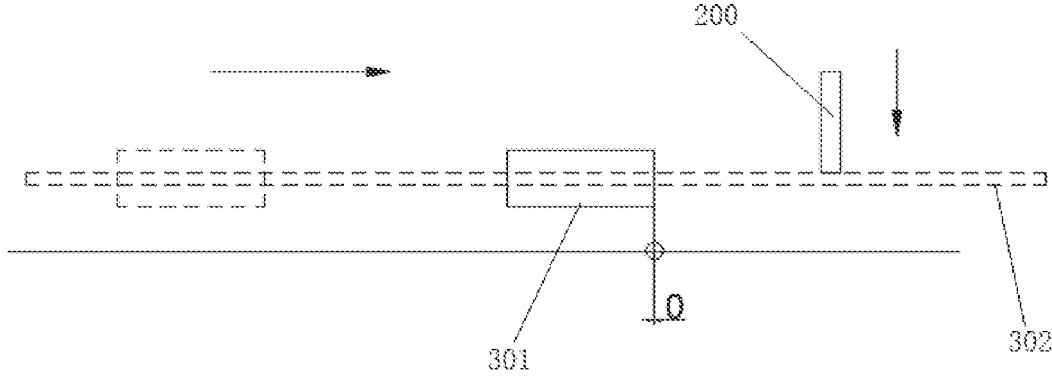
FIG. 4 is a schematic diagram of the motion body of the motion stage system provided in the present application which is matched with the vibration reduction device when moving to a target position.

For this purpose, the control device 500 is specifically used for, when it is judged according to feedback information of the position detection device 400 that the motion body 301 moves to the preparation position with the preset distance from the target position, controlling the action end of the vibration reduction device 200 to act, so that the action end of the vibration reduction device 200 contacts with the motion body 301 or the driving device while the motion body 301 moves to the target position. That is, when the motion body 301 moves to the preparation position as shown in FIG. 3, the vibration reduction device 200 may be started, and the action end of the vibration reduction device 200 is controlled to move in a direction close to the motion body 301; and when the motion body 301 moves to the target position as shown in FIG. 4, the action end of the vibration reduction device 200 moves in place synchronously at the moment, so that the vibration reduction device 200 synchronously suppresses the vibration of the motion body 301 while the motion body 301 moves to the target position, thus further improving a rapid suppression effect and a vibration suppression efficiency. In the embodiment, the preset distance should not only consider the motion parameters of the motion body 301, but also comprehensively consider a transmission time of an electric signal. The consideration of the transmission time of the electric signal refers to considering a time from collection of a motion condition of the motion stage 300 to transmission of the motion condition to the control device 500 and a time from sending of a signal by the control device 500 to receiving of the signal by the vibration reduction device to act. Specifically, a response time of the vibration reduction device 200 to the signal of the control device 500 is T1, a reaction time of the vibration reduction device after receiving the signal of the control device 500 is T2, a maximum acting time of the vibration reduction device 200 is T3, and an error prevention time reserved for flexible protection is T4. In order to ensure that a vibration suppression action of the above-mentioned accurate occasion can be achieved, a sum of the four times needs to be within a certain limited range, which means that $T1+T2+T3+T4<T_p$, wherein $T_p$ is a time from a beginning of motion of the motion body 301 to a moment when inertial vibration is generated by deceleration and positioning to be performed on the motion body.

In the present application, for the inertial vibration amplitude in the step S3, the control device 500 determines the inertial vibration amplitude of the motion body 301 in real time according to the feedback information of the position detection device 400, so as to detect the inertial vibration amplitude of the motion body 301 in real time, and the inertial vibration amplitude detected in real time can provide a basis for judging whether the vibration reduction action of the vibration reduction device 200 is achieved. The control device 500 specifically controls the action end of the vibration reduction device 200 to contact with the motion body 301 or the driving device until the inertial vibration amplitude of the motion body 301 is smaller than a preset amplitude. When the vibration is suppressed, a relationship between the inertial vibration amplitude of the motion body 301 and the preset vibration amplitude is determined in real time through the feedback information of the position detection device 400, thus finishing vibration reduction more accurately.

Furthermore, the position detection device 400 may be an absolute grating ruler device, which has very good detection accuracy and reaction speed, and can greatly improve the accuracy of vibration reduction. Certainly, the position detection device not only is limited to the absolute grating ruler device, but also may be other position detection modules with high accuracy and high reaction speed for substitution, which is not limited specifically.

Furthermore, structural composition of the vibration reduction device 200 comprises a telescopic driving device. One end of a telescopic portion of the driving device may contact the motion body 301 or contact with the driving device to form the action end of the vibration reduction device 200. Specifically, the telescopic driving device may be a linear motor device, a piezoelectric ceramic element, a magnetostriction element, an electric push rod device, a hydraulic push rod device or other linear telescopic devices.

Furthermore, the vibration reduction device 200 further comprises a buffer structure, and the buffer structure is mounted at a telescopic end of the telescopic driving device, and is used for contacting with the motion body 301 or the driving device. The arrangement of the buffer structure may make the telescopic driving device better contact with the motion body 301 or the driving device, thus playing a role of buffer protection. The buffer structure may be an aluminum alloy cushion block, a brass block, oil film paper or other contact buffer structures. Those skilled in the art may make appropriate transformation design on this basis without limitation.

Furthermore, structural composition of the driving device may comprise a driving motor and a screw rod 302. The screw rod 302 is pivotally fixed on the stage body, and the screw rod 302 movably penetrates through the motion body 301, and is in threaded fit with the motion body 301, while the driving motor is mounted on the stage body, and an output shaft is connected with one end of the screw rod 302.

That is, the control device 500 drives the screw rod 302 to rotate by controlling the driving motor to rotate, and then drives the motion body 301 to move, so that the motion of the motion body 301 is controlled. Certainly, a structure of the driving device may also be composed of other structures, as long as the driving device can drive the motion body 301 to move, which is not limited specifically.

Furthermore, taking the action end of the vibration reduction device 200 contacting with the driving device as an example:

The step S2 specifically comprises the following step.

The action end of the vibration reduction device is controlled to contact with the output shaft of the driving motor or the screw rod based on the vibration reduction mode, so that the contact friction force used for suppressing vibration of the motion body is generated. In order to achieve better vibration suppression effect, the action direction of the action end of the vibration reduction device 200 is orthogonal to an axial direction of the output shaft of the driving motor, or is orthogonal to an axial direction of the screw rod 302.

Figure 5:
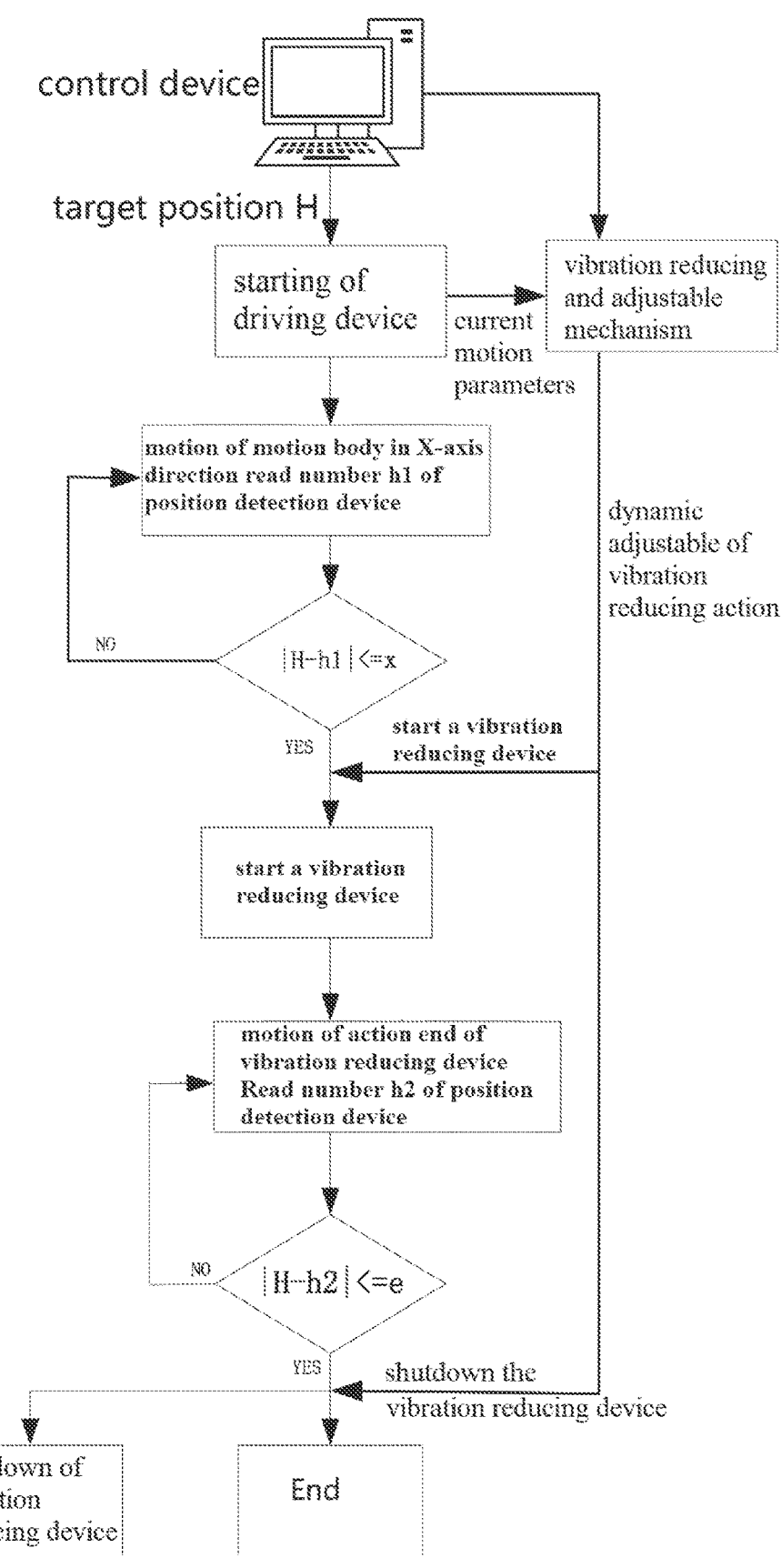
FIG. 5 is a flow chart of a vibration reduction action of the motion stage system provided in the present application.

As shown in FIG. 5, a vibration reduction process of the motion stage system designed based on the method of the present application may be as follows.

In response to the motion instruction, the control device 500 inputs a displacement, a speed and an accelerated speed to the driving device of the motion stage 300, and controls the motion body 301 to move in the X-axis direction through the driving device.

The motion body 301 begins to move, a vibration reduction and adjustment mechanism of the control device 500 acquires the motion parameters of the motion body 301 to dynamically adjust the vibration reduction action of the vibration reduction device 200, that is, the vibration reduction mode of the vibration reduction device 200 is determined. Meanwhile, the position detection device 400 feeds back a position h1 of the motion body 301 in real time. When the control device 500 judges that the motion body 301 reaches the preparation position with a distance X from the target position, which means that |H−h1|=X, the vibration reduction device 200 is started, and the action end of the vibration reduction device 200 is controlled to begin to move.

When the motion body 301 reaches the target position, the action end of the vibration reduction device 200 just contacts with the motion body 301 or the driving device, and synchronously achieves the vibration suppression action on the motion body 301. In this process, the control device 500 monitors the inertial vibration amplitude of the motion body 301 in real time based on the feedback information of the position detection device 400. When the control device 500 judges that the inertial vibration amplitude is less than or equal to a preset amplitude e, which means that |H−h2|≤e, the control device 500 gives the instruction to stop vibration reduction, and drives the action end of the vibration reduction device 200 to reset.

The above describes the rapid active vibration reduction method for the high-speed motion stage provided by the present application in detail. For those of ordinary skills in the art, there will be changes in the specific embodiments and the application scope according to the idea of the embodiments of the present application. To sum up, the contents of the specification should not be understood as limiting the present application.

We claim:

1. A rapid active vibration reduction method for a high-speed motion stage, comprising the following steps of:

S1: acquiring motion parameters of a motion body of the motion stage in current motion, and determining a vibration reduction mode of a vibration reduction device according to the motion parameters; wherein the motion parameters comprise a speed, an accelerated speed and a displacement of the motion body; the vibration reduction mode determines a magnitude of output displacement, a magnitude of force and a moment of vibration reduction output of the vibration reduction device; and a response time of the vibration reduction device to a signal of a control device is T1, a reaction time of the vibration reduction device after receiving the signal of the control device is T2, a maximum acting time of the vibration reduction device is T3, an error prevention time is T4, and a time from a beginning of motion of the motion body to a moment when inertial vibration is generated by deceleration and positioning to be performed on the motion body is $T_p$, and when $T1+T2+T3+T4<T_p$, the time is the moment of vibration reduction output of the vibration reduction device; and S2: controlling an action end of the vibration reduction device to contact with the motion body of the motion stage or contact with a driving device for driving the motion body to move based on the vibration reduction mode during a vibration reduction phase, so that a contact friction force used for suppressing vibration of the motion body is generated;

wherein the vibration reduction device is arranged outside the motion body, the action end of the vibration reduction device is telescopically controlled, and the action end does not contact with the motion body or does not contact with the driving device when the motion body is in a high-speed motion phase prior to the vibration reduction phase.

2. The rapid active vibration reduction method for the high-speed motion stage according to claim 1, wherein the S2 specifically comprises:

controlling the action end of the vibration reduction device to contact with the motion body based on the vibration reduction mode, so that the contact friction force used for suppressing vibration of the motion body is generated;

wherein an action direction of the action end of the vibration reduction device is orthogonal to a motion direction of the motion body.

3. The rapid active vibration reduction method for the high-speed motion stage according to claim 1, wherein the S2 specifically comprises:

S21: controlling a position detection device to acquire displacement information of the motion body;

S22: when it is judged according to the displacement information that the motion body moves to a preparation position with a preset distance from a target position, controlling the action end of the vibration reduction device to act based on the vibration reduction mode, so that the action end of the vibration reduction device contacts with the motion body or the driving device during the vibration reduction phase while the motion body moves to the target position; and S23: controlling the action end of the vibration reduction device to contact with the motion body or the driving device until an inertial vibration amplitude of the motion body is smaller than a preset amplitude, wherein the inertial vibration amplitude is determined according to detection data of the position detection device.

4. The rapid active vibration reduction method for the high-speed motion stage according to claim 3, wherein the position detection device is an absolute grating ruler.

5. The rapid active vibration reduction method for the high-speed motion stage according to claim 3, wherein the vibration reduction device comprises a telescopic driving device; and one end of a telescopic portion of the driving device is capable of contacting with the motion body or contacting with the driving device.

6. The rapid active vibration reduction method for the high-speed motion stage according to claim 5, wherein the vibration reduction device further comprises a buffer structure; and the buffer structure is mounted at a telescopic end of the telescopic driving device, and is used for contacting with the motion body or the driving device.

7. The rapid active vibration reduction method for the high-speed motion stage according to claim 5, wherein the telescopic driving device is a linear motor device, a piezo-electric ceramic element, a magnetostriction element, an electric push rod device, a hydraulic push rod device or other linear telescopic devices.

8. The rapid active vibration reduction method for the high-speed motion stage according to claim 6, wherein the buffer structure is an aluminum alloy cushion block, a brass block, oil film paper or other contact buffer structures.

9. The rapid active vibration reduction method for the high-speed motion stage according to claim 1, wherein the driving device comprises a driving motor and a screw rod;

the screw rod is pivotally fixed on a stage body of the motion stage, and the screw rod movably penetrates through the motion body, and is in threaded fit with the motion body; and the driving motor is mounted on the stage body, and an output shaft is connected with one end of the screw rod.

10. The rapid active vibration reduction method for the high-speed motion stage according to claim 9, wherein the S2 specifically comprises:

controlling the action end of the vibration reduction device to contact with the output shaft of the driving motor or contact with the screw rod based on the vibration reduction mode during the vibration reduction phase, so that the contact friction force used for suppressing vibration of the motion body is generated;

wherein an action direction of the action end of the vibration reduction device is orthogonal to an axial direction of the output shaft of the driving motor, or is orthogonal to an axial direction of the screw rod.

* * * * *